Dec. 12, 1950 — G. A. MAU — 2,534,046
VALVE CONSTRUCTION FOR PROPORTIONING DEVICES
Filed Oct. 21, 1949 — 2 Sheets-Sheet 1
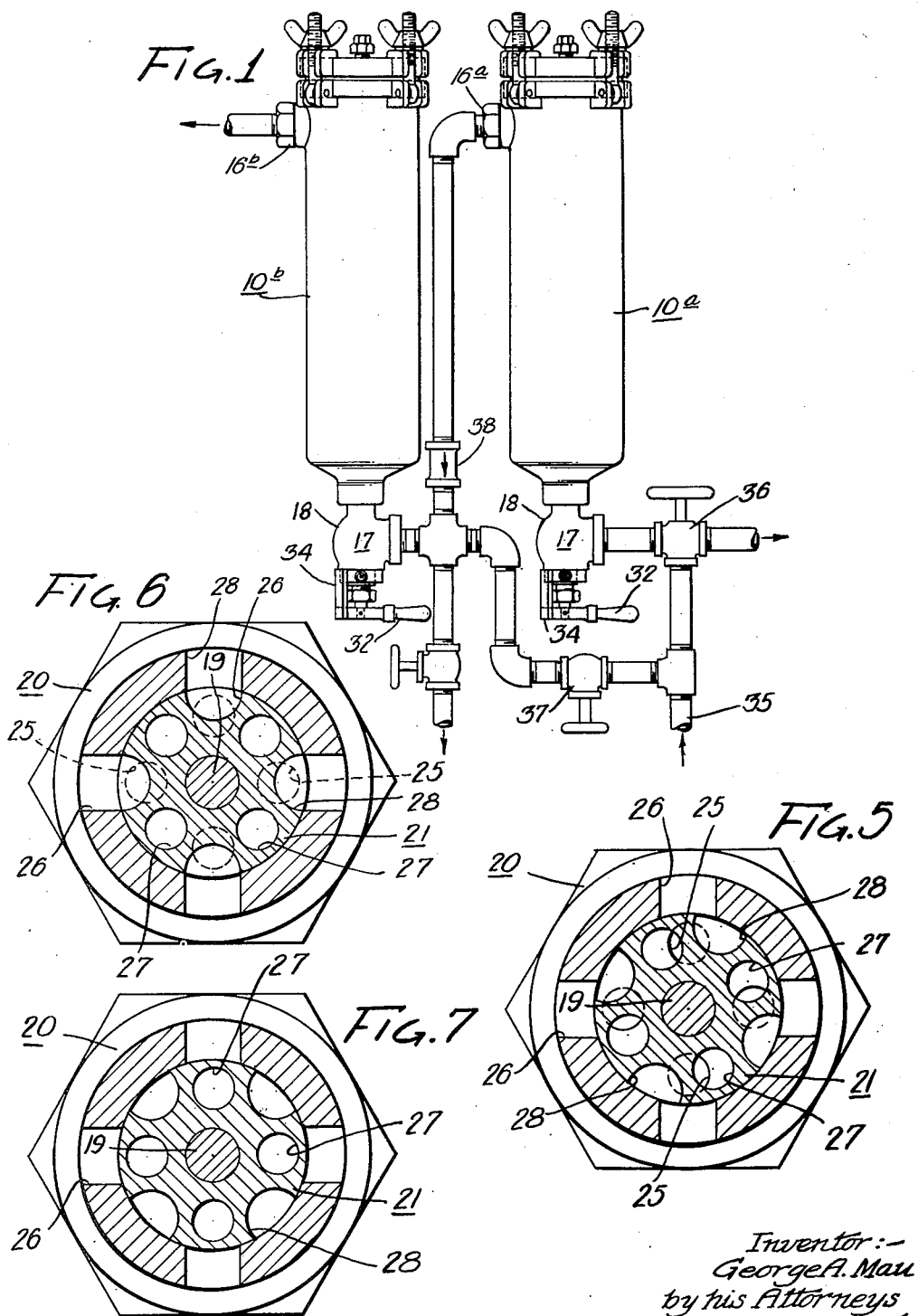
Inventor:—
George A. Mau
by his Attorneys
Howson & Howson Dec. 12, 1950  G. A. MAU  2,534,046
VALVE CONSTRUCTION FOR PROPORTIONING DEVICES
Filed Oct. 21, 1949  2 Sheets-Sheet 2
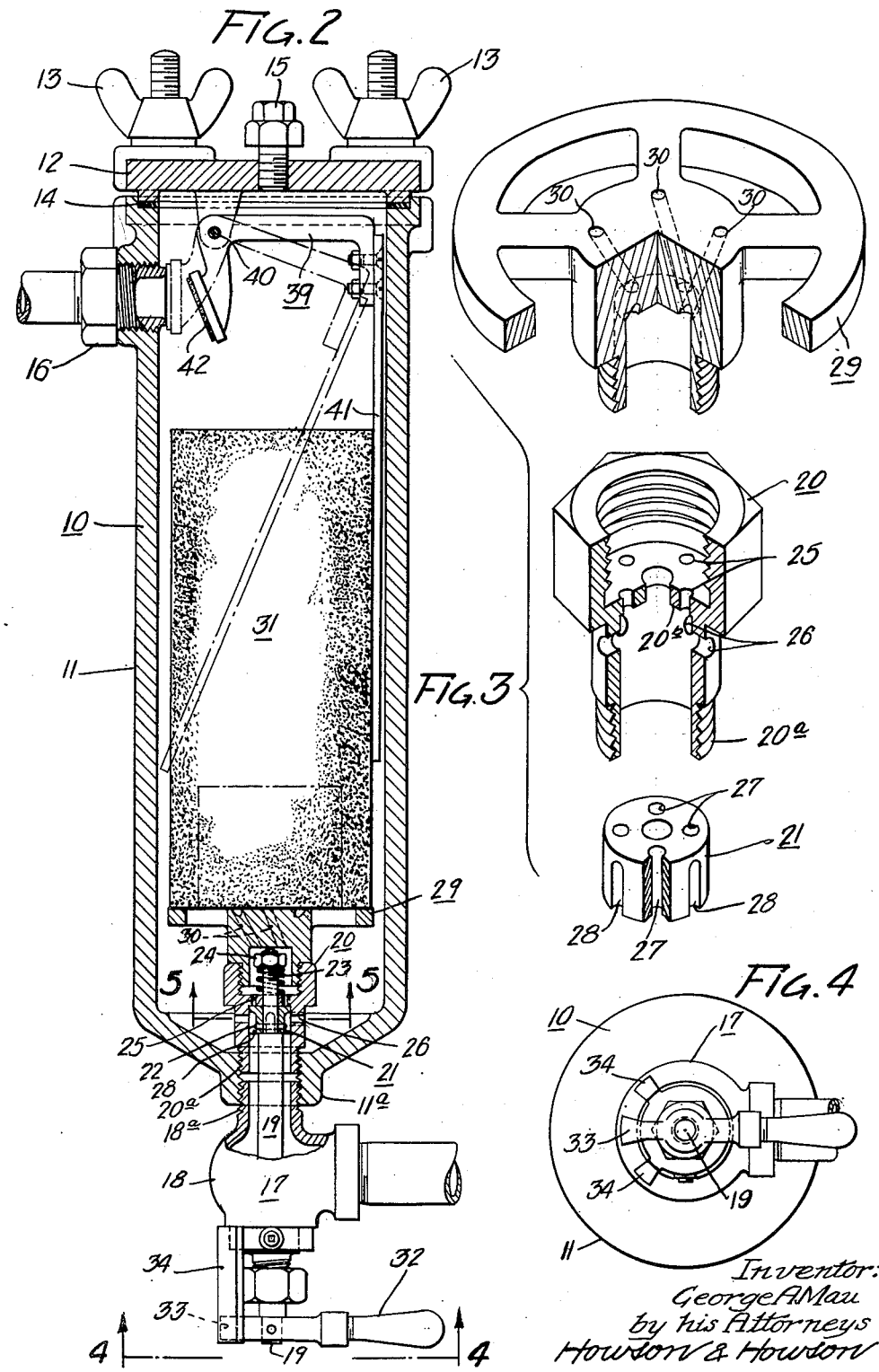
Inventor:
George A Mau
by his Attorneys
Howson & Howson Patented Dec. 12, 1950

2,534,046

UNITED STATES PATENT OFFICE 2,534,046

VALVE CONSTRUCTION FOR PROPORTIONING DEVICES

George A. Mau, Lakewood, Ohio, assignor to Johnson-March Corporation, Philadelphia, Pa., a corporation of Delaware Application October 21, 1949, Serial No. 122,731

12 Claims. (Cl. 210—36)

This invention relates to improvements in valves for controlling fluid flow, and more particularly to improvements in valves for use in conjunction with proportioning devices wherein a soluble material, such as a wetting agent, is added to water or other liquid at a uniform rate.

Heretofore in devices of this kind the soluble material was not always added to the water at a uniform rate due to the fact that such materials are more soluble in warm water than they are in cold water. Thus in the summer when the water flowing through the proportioning device is relatively warm more of the soluble material will be added to the water than in the winter when the water is cold, and in the spring and fall when the water is at some temperature between the two extremes a still different amount of the soluble material will be added to the water.

With the foregoing in mind, the principal object of this invention is to provide for use with proportioning apparatus as set forth novel valve means operable to cause the addition of a soluble material, such as a wetting agent, to water at a substantially constant rate regardless of seasonal changes in the water temperature.

Another object of this invention is to provide novel valve means as set forth which is constructed and operable to alter the path of flow of water with respect to a mass of soluble material in proportioning apparatus so as to be able to change the amount of solute added to the water.

Another object of this invention is to provide a novel valve means for use in proportioning devices which is highly effective and efficient in operation, relatively inexpensive to manufacture and substantially foolproof in use.

These and other objects of the invention and the various features and details of the construction and operation thereof are hereinafter fully set forth and described with reference to the accompanying drawings, in which:

Fig. 1 is an elevational view of proportioning apparatus embodying the present invention;

Fig. 2 is a vertical sectional view through one chamber of the proportioning apparatus showing the valve of the present invention in the neutral position;

Fig. 3 is a perspective view of some of the elements of the invention in detached relation;

Fig. 4 is a view taken along the line 4—4 in Fig. 2;

Fig. 5 is a sectional view taken along the line 5—5 in Fig. 2 with the valve in the neutral position and the water leaving both the side and top ports;

Fig. 6 is a view similar to Fig. 5 showing the valve in the summer position with the water leaving by the side ports; and Fig. 7 is a view similar to Fig. 5 showing the valve in the winter position with the water leaving by the top ports.

Referring more specifically to the drawings, reference numeral 10 designates generally a proportioning device comprising a cylindrical casing 11 having its upper end open and adapted to be closed by a cover 12 secured to the casing 11 by means of wing nuts 13, a gasket 14 being positioned between the casing 11 and the cover 12 to prevent leakage. An air vent 15 is provided in the cover 12 to permit the flow of air in and out of the proportioning device 10. At the upper end of the casing 11 is a water outlet port 16 while a proportioning valve 17 made according to the present invention is located at the bottom of the casing 11.

The proportioning valve 17 comprises a casing 18 in which is provided the usual packing gland (not shown) through which the valve stem 19 passes. The valve casing 18 is secured to the bottom of the proportioning device 10 by means of threads 18a screwed into the inlet 11a at the bottom of the casing 11. A valve seat 20 is positioned inwardly of the casing 11 and is secured to the casing 11 in coaxial alignment with the valve casing 18 by means of a threaded end 20a screwed into the upper end of the inlet 11a of the casing 11. A valve element 21 is fixedly secured to the valve stem 19 by means of a pin 22 and adapted for rotation therewith. The valve element 21 is cooperatively engaged with the valve seat 20 and is held tightly against the lower side 20b of the valve seat 20 by means of a spring 23 secured to the upper end of the valve stem 19 by a nut 24.

The valve seat 20 has two sets of openings therein, one set of openings 25 going vertically through and the other set of openings 26 on the same axis as the openings 25 extending laterally through the side wall 20a of the valve seat 20. The valve element 21 also has two sets of ports therein one set of ports 27 being vertically therethrough and arranged for cooperation with the openings 25 in the valve seat 20. The other set of ports 28 is circumferentially displaced 45° from the ports 27 and are cut partially up the side of the valve element 21 as most clearly shown in Fig. 3. These ports 28 are arranged for cooperation with the openings 26 in the valve seat 20.

In coaxial alignment with the valve seat 20 and fixedly secured thereto is a spider 29 which has a set of orifices 30 extending therethrough. The orifices 30 are inclined tangentially to the vertical axis of the spider 29 and are arranged so as to eject the water with a swirling motion. A cylindrical mass of water soluble material 31 rests on the spider 29 in the position shown.

Attached to the lower end of the valve stem 19 is a handle 32 having a stop 33 thereon. Stop 33 is adapted to engage circumferentially spaced lugs 34 projecting from the valve casing 18 and thus limit rotation of the valve stem 19 and hence of the valve element 21. Thus, the lugs 34 are disposed so that when the handle 32 is at one limit position the ports 28 of the valve element 21 are in register with the openings 26 in the valve seat 20 and the openings 25 of the valve seat 20 are closed by the valve element 21, therefore, water will flow upwardly through ports 28 and laterally outward through the openings 26 thence upwardly along the mass of soluble material 31 and be discharged from the outlet port 16. This is the position used, for example, in the summer when the water usually is warm and does not have to be in contact with the soluble material very long to form the proper solution.

When the handle 32 is turned to the other limit position the ports 27 of the valve element 21 are in register with the openings 25 in the valve seat 20 and the openings 26 of the valve seat 20 are closed by the valve element 21. In this case the water is discharged directly upward through the orifices 30 of the spider 29 and into contact with the bottom of the mass of soluble material 31. The water then works its way laterally outward and passes upwardly along the soluble material 31 and is discharged from the proportioning device 10 through the outlet 16. This is the position used, for example, in the winter months when the water is cold and must be in contact with the soluble material for a longer time in order to take-up the required amount of said material.

When the handle is midway between the two limit positions both sets of openings 25 and 26 in the valve seat 20 are partially opened by the two sets of ports 27 and 28, respectively, of the valve element 21 and part of the water is discharged in a swirling motion under the soluble material 31 while the remainder of the water flows up along the side of the soluble material 31. This is the neutral position and is used when the water is at some medium temperature and must be kept in contact with the soluble material 31 for a slightly longer time than is needed in the warm water position in order to form the proper solution.

Means are provided in the casing 11 to stop the flow of liquid therethrough when the soluble material 31 has been diminished. In the present instance a bracket 39 is pivotally mounted to the cover 12 as shown at 40 and has an extension 41 thereon which fits downwardly in the casing and is adapted to be held to one side of the casing by the mass of soluble material. As the soluble material is diminished, the bracket 39 is allowed to pivot about the point 40 and in doing so positions a gasket 42 over the outlet opening 16, thus cutting off the flow of liquid.

Fig. 1 shows an arrangement whereby two of the proportioning devices may be connected together so that the flow of water may be selectively controlled to flow through either one or both of the proportioning devices. The water enters at 35 and when the three-way valve 36 is open and globe valve 37 closed the water will flow up through the proportioning device 10a on the right, discharge through its outlet 16a, pass down through check valve 38 into the proportioning device 10b on the left and thence through the outlet 16b. On the other hand, when the globe valve 37 is open and the three-way valve 36 closed, water will flow only through the proportioning device 10b on the left. The purpose of the check valve 38 is to prevent the reverse flow of water through the proportioning device 10a on the right when the three-way valve 36 is turned to permit drainage of the proportioning device 10b.

From the foregoing it will be seen that the present invention provides novel valve means for use with proportioning apparatus to cause addition of a soluble material, such as a wetting agent, to water at a substantially constant rate regardless of seasonal changes in the water temperature. The invention also provides novel valve means which is constructed and operable to alter the path of flow of water with respect to a mass of soluble material in a proportioning apparatus so as to be able to change the amount of solute added to the water.

While certain embodiments of the invention have been illustrated and described herein it is not intended to limit the invention to such disclosures and changes and modifications may be incorporated and embodied therein within the scope of the following claims.

I claim:

1. In a proportioning device comprising a casing having liquid inlet and outlet openings respectively at the bottom and top thereof and adapted to contain a mass of soluble material in contact with liquid flowing through the casing, a valve mechanism including a valve seat secured in the liquid inlet opening, said valve seat having therein a first set of ports opening upwardly into the casing and a second series of ports opening laterally into the casing through said valve seat, a valve element cooperatively associated with said valve seat and movable between predetermined limit positions, said valve element having a plurality of passages therein arranged in one limit position of the valve element to communicate with and provide liquid flow through the first set of ports only in the valve seat and in the other limit position thereof to communicate with and provide liquid flow through the other set of ports only in said valve seat.

2. In a proportioning device comprising a casing having liquid inlet and outlet openings respectively at the bottom and top thereof and adapted to contain a mass of soluble material in contact with liquid flowing through the casing, a valve mechanism including a valve seat secured in the liquid inlet opening, said valve seat having therein a first set of ports opening upwardly into the casing and a second series of ports opening laterally into the casing through the valve seat, a valve element cooperatively associated with said valve seat and movable between predetermined limit positions, said valve element having two sets of passages therein arranged so that in one limit position of the valve element one set of passages is in communication with the first set of ports only in the valve seat and in the other limit position thereof the other set of passages is in communication with the other set of ports only in said valve seat.

3. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion, valve mechanism including a member mounting said support member and secured in the liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having a plurality of passages therein arranged in one limit position of the valve element to communicate with and provide liquid flow through the first set of ports only in the mounting member and in the other limit position thereof to communicate with and provide liquid flow through the other set of ports only in said mounting member.

4. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion, valve mechanism including a member mounting said support member and secured in the liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having two sets of passages therein arranged so that in one limit position of the valve element one set of passages is in communication with the first set of ports only in the mounting member and in the other limit position thereof the other set of passages is in communication with the other set of ports only in said mounting member.

5. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion, valve mechanism including a member mounting said support member and secured in the liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having two sets of passages therein arranged in one limit position of the valve element to have one set of passages communicate with and provide liquid flow through the first set of ports only in the mounting member and in the other limit position thereof to have the other set of passages communicate with and provide liquid flow through the other set of ports only in said mounting member, and sets of passages being arranged so that in an intermediate position of the element the passages are at least partially in communication with both the first and second sets of ports in the mounting member to permit flow therethrough.

6. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion and tangentially inclined about a center point so that liquid discharged upwardly therethrough is given a swirling motion, valve mechanism including a member mounting said support member and secured in a liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having a plurality of passages therein arranged in one limit position of the valve element to communicate with and provide liquid flow through the first set of ports only in the mounting member and in the other limit position thereof to communicate with and provide liquid flow through the other set of ports only in said mounting member.

7. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion and tangentially inclined about a center point so that liquid discharged upwardly therethrough is given a swirling motion, valve mechanism including a member mounting said support member and secured in a liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having two sets of passages therein arranged in one limit position of the valve element to have one set of passages communicate with and provide liquid flow through the first set of ports only in the mounting member and in the other limit position thereof to have the other set of passages communicate with and provide liquid flow through the other set of ports only in said mounting member.

8. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion and tangentially inclined about a center point so that liquid discharged upwardly therethrough is given a swirling motion, valve mechanism including a member mounting said support member and secured in a liquid inlet opening in the lower end of the casing, said mounting member having therein a first set of ports in register with the lower ends of the orifices in the support member and a second series of ports opening laterally into the casing through said mounting member, a valve element cooperatively associated with said mounting member and movable between predetermined limit positions, said valve element having two sets of passages therein arranged in one limit position of the valve element to have one set of passages communicate with and provide liquid flow through the first set of ports only in the mounting member and in the other limit position thereof to have the other set of passages communicate with and provide liquid flow through the other set of ports only in said mounting member, and said sets of passages being arranged so that in an intermediate position of the element the passages are at least partially in communication with both the first and second sets of ports in the mounting member to permit flow therethrough.

9. In a proportioning device comprising a casing having liquid inlet and outlet openings respectively at the bottom and top thereof and adapted to contain a mass of soluble material in contact with liquid flowing through the casing, a valve mechanism including a valve seat having therein a first set of ports opening in a direction axially of the casing and a second set of ports opening transversely of the casing, a valve element cooperatively associated with said valve seat and movable between predetermined limit positions, said valve element having a plurality of passages therein arranged in one limit position of the valve element to communicate with and provide liquid flow through the first set of ports only in the seat and in the other limit position thereof to communicate with and provide liquid flow through the other set of ports only in said seat.

10. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion, valve mechanism including a mounting member secured in the liquid inlet opening in the lower end of the casing and having therein a first set of ports in register with the lower ends of the orifices in the support member and a second series of ports opening laterally into the casing through said mounting member, a valve element cooperatively associated with said mounting member and movable between predetermined limit positions, a handle exteriorly of the casing operable manually to rotate the valve element, and spaced stop means in the path of the handle to limit rotation thereof and of the valve element to said predetermined positions, said valve element having a plurality of passages therein arranged in one limit position of the valve element to communicate with and provide liquid flow through the first set of ports only in the mounting member and in the other limit position thereof to communicate with and provide liquid flow through the other set of ports only in said mounting member.

11. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion and tangentially inclined about a center point so that liquid discharged upwardly therethrough is given a swirling motion, valve mechanism including a mounting member secured in the liquid inlet opening in the lower end of the casing and having therein a first set of ports in register with the lower ends of the orifices in the support member and a second series of ports opening laterally into the casing through said mounting member, a valve element cooperatively associated with said mounting member and movable between predetermined limit positions, a handle exteriorly of the casing operable manually to rotate the valve element, and spaced stop means in the path of the handle to limit rotation thereof and of the valve element to said predetermined positions, said valve element having a plurality of passages therein arranged in one limit position of the valve element to communicate with and provide liquid flow through the first set of ports only in the mounting member and in the other limit position thereof to communicate with and provide liquid flow through the other set of ports only in said mounting member.

12. In a proportioning device comprising a casing having liquid inlet and outlet openings respectively at the bottom and top thereof and adapted to contain a mass of soluble material in contact with liquid flowing through the casing, a support member in the casing for the soluble material having a surface portion upon which said material is adapted to rest, said support member having therein a plurality of orifices opening upwardly through said surface portion and tangentially inclined about a center point so that liquid discharged upwardly therethrough is given a swirling motion, valve mechanism including a mounting member secured in a liquid inlet opening in the lower end of the casing and having therein a first set of ports in register with the lower ends of the orifices in the support member and a second series of ports on the same diametrical plane as said first set of ports opening laterally into the casing through said mounting member, a valve element cooperatively associated with said mounting member and movable between predetermined limit positions, said valve element having therein a first set of passages extending axially therethrough and a second set of passages displaced forty-five degrees circumferentially from the first set of passages and extending only partially in the outer surface of the valve element, said passages being arranged in one limit position of the valve element to have the first set of passages in communication with the first set of ports only in the mounting member and in the other limit position thereof to have the second set of passages in communication with the other set of ports only in said mounting member.

GEORGE A. MAU.

REFERENCES CITED

The following references are of record in the file of this patent:

UNITED STATES PATENTS

| Number | Name | Date |
|--------|------|------|
| 412,910 | Blessing | Oct. 15, 1889 |
| 452,172 | West | May 12, 1891 |
| 765,154 | Sweet | July 12, 1904 |
| 765,524 | Tyson | July 19, 1904 |
| 867,521 | Moulton | Oct. 1, 1907 |
| 2,462,886 | Morrow | Mar. 1, 1949 |